Oct. 15, 1929.  T. F. BARTON  1,731,883
REGULATING SYSTEM
Filed Aug. 15, 1928
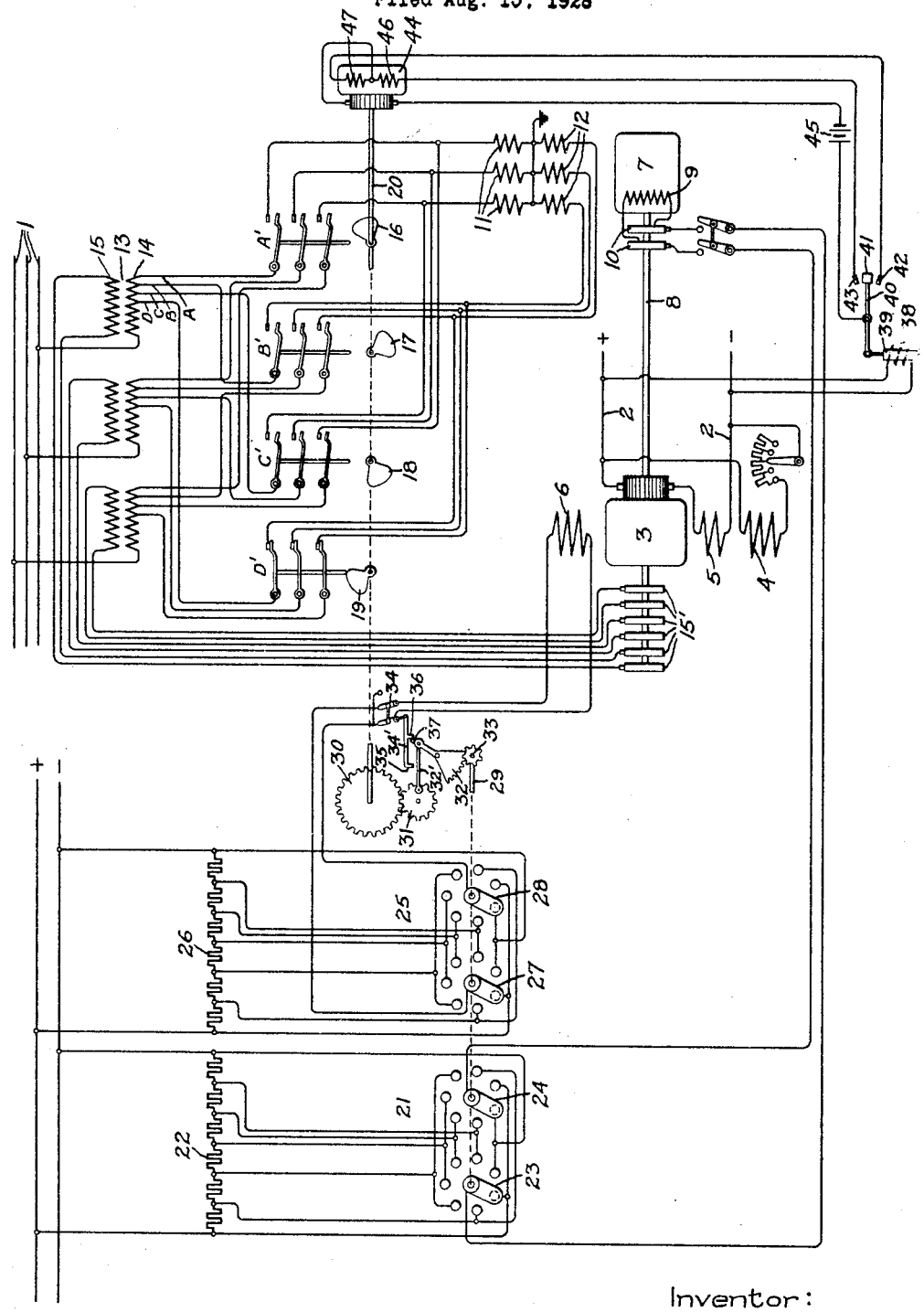
Inventor:
Theophilus F. Barton Patented Oct. 15, 1929

1,731,883

UNITED STATES PATENT OFFICE

THEOPHILUS F. BARTON, OF UPPER MONTCLAIR, NEW JERSEY, ASSIGNOR TO GENERAL ELECTRIC COMPANY, A CORPORATION OF NEW YORK

REGULATING SYSTEM

Application filed August 15, 1928. Serial No. 299,790.

My invention relates to regulating systems and more particularly to voltage regulating systems employing a regulating transformer provided with taps.

In systems of distribution comprising an alternating current supply circuit of substantially constant voltage and a direct current distribution circuit interconnected by converting means such as synchronous converters it is usually desirable to change the voltage applied to the synchronous converter in order to control the direct current voltage under various load and operating conditions. Field control of synchronous converters, and synchronous boosters operated in series with synchronous converters, have been employed with success but these arrangements are limited in the range of voltage control. It is also common to regulate an alternating voltage by means of a regulating transformer by changing connections to different taps regularly spaced on the transformer. The arrangements which employ various tap-changing schemes are usually objectionable because of the step-by-step action, sparking difficulties, of the complication in switching. Switching means have also been employed in connection with induction regulators to obtain a gradual transition from one transformer tap to another but a plurality of induction regulators are required on polyphase circuits and this arrangement is not generally desirable because of the comparatively high cost of the induction regulators.

It is an object of my invention to provide a new and improved tap changing arrangement for transformers whereby fewer and less expensive devices may be used than have been used heretofore in order to vary automatically the voltage of a transformer over a wide range in a gradual and even manner.

In accordance with an embodiment of my invention which has been illustrated in a system of distribution for the control of synchronous converters, I utilize a high voltage revolving-field booster which is provided with a double armature winding placed in series relation with the high voltage primary winding of the transformer supplying the synchronous converter. The transformer is provided with extended windings having taps and is star connected through one half of the booster windings. The mid-point of the booster windings being connected to form the neutral connection of the transformer. The booster field is controlled in a manner to permit bridging between transformer taps and making connections successively to different taps without interrupting the supply to the transformer. With no voltage generated in the booster windings, voltage is impressed on the tap to which the booster is connected. By applying excitation of the proper amount and direction the free ends of the booster windings may be brought to the same potential as the adjacent taps. When this is accomplished these free ends may be connected to adjacent taps and then the one end may be opened. If the booster voltage is then reduced to zero, line potential is applied to these second tap connections. This arrangement permits smooth transfer from one tap to another.

My invention will be better understood when taken in connection with the accompanying drawing and its scope will be pointed out in the appended claims.

The single figure of the accompanying drawing illustrates one embodiment of my invention as adapted for use in connection with a synchronous converter interconnecting an alternating current supply circuit and a direct current distribution circuit. It will be understood that these illustrations are entirely diagrammatic and for purposes of simplicity no attempt has been made to show a commercial form involving electrical interlocks, relays and connections in the highly developed form which will probably be used with the regulating apparatus in practice.

In the drawing, 1 indicates an alterating current supply circuit and 2 a direct current distribution circuit. These two circuits are interconnected by a synchronous converter 3 which is provided with a shunt field winding 4, a series field winding 5, and an auxiliary commutating field winding 6. A dynamo-electric machine, hereinafter refered to as a synchronous booster 7, is connected to rotate in electrical phase synchronism with the synchronous converter by means of any convenient connection indicated as a shaft 8. The synchronous booster 7 is of the revolving-field type having a rotating field 9 connected to slip rings 10 and is provided with a double armature winding comprising two windings 11 and 12 so connected that with a given direction of excitation on the field, the voltage of one winding will be in the "boost" direction and the other winding will be in the "buck" direction. The winding in use under any particular condition will depend upon the position of the tap switches so the supply transformer to be de- described hereinafter.

The synchronous converter 3 is connected to the alternating current circuit 1 by means of the transformer 13 comprising primary windings 14 and secondary windings 15. The secondary windings 15 are connected to the converter armature windings by means of the usual slip rings 15'. The primary windings 14 are each provided with an extended winding having a desired number of taps which for purposes of illustration have been shown as four and designated as A, B, C and D. The high voltage neutral of the transformer is formed at the common point of the synchronous booster armature windings. Connections between the transformer taps and the booster windings are made by means of tap switches A', B', C' and D' which may be of any suitable type such as triple-pole oil circuit breakers. It will be obvious by inspection that tap D is the highest voltage tap and that tap A is the lowest voltage tap, that is, maximum transformer voltage is applied to the collector rings when tap D is used and minimum transformer voltage is applied to the collector rings when tap A is used.

The switches have been illustrated for purposes of simplicity as being cam operated but it will be obvious to those skilled in the art that full automatic operation may be obtained by entirely electrical means and may be used if preferred without departing from my invention in its broader aspects.

The operating mechanism for the tap switches comprises a series of four cams 16, 17, 18 and 19 adapted to engage the respective switch operating mechanisms in proper time sequence in order to close the switches in the sequence A, B, C, D and open in the reverse sequence. For purposes of illustration these cams are shown on a common operating shaft 20, each with a center line in the proper space relation for the particular number of operations shown. It will be obvious that the space relation between cam center lines will depend upon the number of switches and the sequence of operation desired.

The excitation of the booster converter is arranged to be controlled in accordance with the position of the tap switches and means are provided for controlling the booster from full boost to full buck by means of a potentiometer type of rheostat 21. The rheostat comprises a tapped resistor 22 connected across a convenient direct current source of energy indicated by plus and minus signs and cooperating contact arms 23 and 24 which are so arranged that when both arms occupy corresponding extreme positions in one direction the field will be excited with maximum current in a given direction and when occupying corresponding extreme positions in the opposite direction the field will be excited with maximum current in the opposite direction. A corresponding movement of both arms from either extreme position gradually reduces the field current to zero when both arms occupy the electrical mid-point of the resistor. The synchronous booster field 9 is connected to the arms 23 and 24. A similar potentiometer type of rheostat 25 is provided for the auxiliary commutating field 6 of the synchronous converter 3. This rheostat comprises a tapped resistor 26 and is provided with cooperating contact arms 27 and 28 which are arranged to control the excitation of the auxiliary commutating field 6 in the same manner as the rheostat 21 controls the booster field 9.

While for purposes of simplicity I have illustrated actuating means comprising gears operated from the cam shaft 20 for operating the rheostat arms 23 and 24 and 27 and 28, various modifications utilizing electroresponsive means for actuating these arms will occur to those skilled in the art, and may be used, if preferred, without departing from my invention in its broader aspects. The rheostat arms 23 and 24 and 27 and 28 are to be operated simultaneously and as shown are mounted on the shaft 29 which is operated from shaft 20 through suitable gearing. The interconnection between shaft 20 and shaft 29 comprises a gear 30 mounted on shaft 20, a gear 31 meshing therewith, a gear sector 32, and a gear 33 mounted on shaft 29 and meshing with the gear sector 32. The gear sector 32 is operatively connected with gear 31 through an eccentrically mounted connecting link 32'. The gear ratio between gears 30 and 31 is so chosen as to obtain a movement of gear sector 32 sufficient to move rheostat arms 23 and 24 and 27 and 28 from an extreme position in one direction to an extreme position in the opposite direction while a given tap switch is maintained in its circuit closing position. This movement permits the synchronous booster 7 to operate from maximum boost to maximum buck for a given tap connection, and similarly permits the auxiliary commutating field to be energized with current from a predetermined maximum in one direction to a predetermined maximum in the opposite direction.

When a synchronous booster is mechanically connected to a synchronous converter it imposes a motor load on the converter when boosting and a generator load on the converter when bucking. It is to be noted that with the armature winding of the booster tapped at the mid-point a given direction of excitation on the field generates a voltage in one half of the winding which will be in the "buck" direction for a given tap connection and a voltage in the other half of the winding which will be in the "boost" direction after the transition to the next succeeding tap. Thus if the booster winding is operating maximum buck on one tap and a change is made to the next tap the booster action is in the reverse direction and the booster is now in the maximum boost direction without changing the direction of excitation. Having this point in mind it will be evident that it will be necessary to reverse the auxiliary commutating field when changing from one tap to another in view of the fact that the synchronous booster imposes a motor load on the converter when boosting and a generator load when bucking.

Various electrical means for effecting a reversal of the auxiliary commutating field will occur to those skilled in the art but for purposes of simplicity in illustration I have shown a mechanical means operatively associated with the gear sector 32. The reversing switch for the field 6 is designated by the numeral 34 and may be of any suitable type. For purposes of illustration I have shown a simple switch having contact arms adapted to slide from a circuit closing position to permit current flow in one direction to a circuit closing position to permit current flow in the opposite direction. The mechanism for moving the switch comprises an operating lever 34' provided with spaced lugs 35 and 36. The gear sector 32 is provided with an extension 37 which is adapted to engage lug 35 or 36 when the sector occupies one or the other of its extreme positions.

In order to illustrate how the regulation may be effected in accordance with an electrical characteristic, such as the current, voltage, power, power factor, etc., of the circuit to be controlled I have shown means responsive to the voltage of the direct current distribution circuit supplied by the synchronous converter. The voltage responsive means, as illustrated, comprises a contact-making voltmeter which includes an operating coil 38, a movable core 39, and an operating lever 40 actuated by said core. A contact 41 is mounted on the movable lever 40 and is arranged to make engagement with oppositely disposed stationary contacts 42 and 43. The contact-making voltmeter is arranged to control operating means for effecting connection to the various taps of transformer 13. For this purpose I have illustrated a reversible motor 44 which is mechanically connected directly, as shown, or through suitable reduction gearing, to shaft 20, and which is electrically connected to be energized from any suitable source indicated by the battery 45. The motor 44 is provided with a field winding 46 which when energized is arranged to produce rotation of the motor armature in one direction, and a field winding 47 which when energized is arranged to produce rotation of the motor armature in the opposite direction. The field winding 46 is connected to be energized when the contacts 41 and 43 of the contact-making voltmeter are in engagement and the field winding 47 is connected to be energized when the contacts 41 and 42 of the contact-making voltmeter are in engagement.

The operation of the illustrated embodiment of my invention is as follows: Since the technic of starting and synchronizing the converter with the alternating current supply circuit is well understood in the art no description is believed necessary in regard to this cycle of the operation and it will be assumed that the synchronous converter has been started and is operating with such a load on the direct current distribution circuit as to require energization from the highest voltage tap, namely D, and that the booster 7 is operating with the rheostat arms 23 and 24 in the maximum boost direction, namely, in the extreme position to the left. Similarly rheostat arms 27 and 28 occupy their extreme position to the left and the reversing switch connects the booster field 6 so as to be energized with current for maximum buck conditions. The maximum buck condition is desirable because of the motor load imposed on the converter which renders the main commutating field too strong under these conditions and requires a bucking field to compensate for the excess main commutating field.

It will now be assumed that the direct current voltage rises above the desired predetermined value and as a consequence contact 41 is moved to engage contact 42. This completes a circuit for motor 44 and completes a circuit to energize field winding 47. Under these conditions motor 44 is arranged to rotate in a direction to move cam 19 in a direction, which as illustrated is clockwise, eventually to open switch D' and close switch C' or in other words to reduce the voltage applied to the synchronous booster armature by changing to the next lowest tap on the transformer primary winding.

With cam D in the position shown the rheostat 21 is in the full boost position and rheostat 25 is in the full buck position. Now as D is moved clockwise rheostats 21 and 25 pass through the neutral position and eventually reach full buck and full boost positions respectively. With the booster operating full buck the potential between the outside terminals of the booster is arranged to be equal and opposite to the potential between the adjacent transformer taps which in this instance is the potential between taps D and C. When this condition is attained cam 18 closes switch C' just before D' opens. During the simultaneous closure of both switches the auxiliary commutating field is interrupted and then reversed as D' is opened. This operation is effected by reversing switch 34 when gear sector extension 37 engages the lug 35 of switch operating lever 34'. As soon as switch C' closes, and switch D' opens, the synchronous converter is operating on the second highest transformer tap and the booster field which was in the maximum buck direction is in the maximum boost direction because the primary winding of the transformer 13 is completed through booster armature winding 11 instead of through armature winding 12.

If, further, voltage reduction is necessary the contact-making voltmeter will continue to make engagement between contacts 41 and 42 and the booster rheostat 21 will move out of the boost position and finally reach the maximum buck position in the same manner as previously described. At this point as determined by the extent of the rotation of shaft 20 switch B' is closed and switch C' is opened to connect the converter to the next lower tap B. The change in booster excitation and the reversal of the auxiliary commutating field are accomplished in identically the same manner as previously described.

The necessity for further voltage reduction will force the converter to the lowest tap, namely A, by an operating sequence similar to that previously described which closes switch A' and opens B'. Demand for still lower voltage will force the booster rheostat 21 into the maximum buck position.

Now if the direct current voltage decreases below a predetermined value the contact-making voltmeter closes its contacts 41 and 43 and thereby energizes the motor 44 through its field winding 46. This causes rotation in the reverse direction and consequently reverses the direction of rotation of the cams and gear mechanism between shafts 20 and 29. The converter voltage is lowered as the rheostat 21 moves out of maximum buck position toward the maximum boost position which, it will be noted, is the proper direction when "tapping up". Continued indication of the desirability of increased voltage will cause the tap changing equipment to "tap up" until the highest tap is reached, each tap change following the sequence outlined above. When the highest tap is reached the converter is regulated to hold proper voltage or load in accordance with the indications of the contact-making voltmeter.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:—

1. In combination, a transformer having a regulating winding provided with a plurality of taps, a dynamo-electric machine having a winding arranged to be connected in series relation with said regulating winding and tapped at its electrical mid-point, said mid-point tap forming one terminal for said regulating winding, means for effecting connection between the outside terminals of the winding of said dynamo-electric machine and said transformer taps, and means operative in accordance with the operation of said first mentioned means for controlling the voltage of said dynamo-electric machine.

2. In combination, a polyphase transformer having regulating windings provided with a plurality of taps, a dynamo-electric machine having a plurality of windings corresponding to the number of phases of said transformer for connection in series relation therewith and having an electrical mid-point tap to form one terminal for said regulating winding, switching means for selectively connecting an outside terminal of said dynamo-electric machine to a predetermined transformer tap, electroresponsive means for controlling said switching means, and means responsive to the operation of said electroresponsive means for controlling the voltage of said dynamo-electric machine.

3. In combination, a polyphase transformer having regulating windings provided with a plurality of taps, a dynamo-electric machine having a plurality of windings corresponding to the number of phases of said transformer, said dynamo-electric machine windings being arranged for connection in series relation with said regulating winding to form a star connection therefor and being provided with a mid-point tap to form the neutral terminal of said star connection, switching means for selectively connecting an outside terminal of said dynamo-electric machine to a predetermined transformer tap, and means interlocked with said switching means for varying the voltage of said dynamo-electric machine from a maximum value in one direction to a maximum value in the opposite direction during the connection to a given tap and for equalizing the potential between the outside terminals of the winding of said dynamo-electric machine and the potential between adjacent taps of said transformer during the transition from one transformer tap to another.

4. In a system of distribution, an alternating current circuit, a direct current circuit, converting means for interconnecting said circuits, a regulating transformer having a tapped primary winding connected to said alternating current circuit and a secondary winding connected to the alternating current terminals of said converter, a dynamo-electric machine having an armature winding tapped at its electrical mid-point and arranged to be connected in series relation with the primary winding of said transformer, switching means for connecting the outside terminals of said armature winding to said transformer taps, means responsive to an electrical characteristic of said direct current circuit for controlling said switching means, and means controlled in accordance with the operation of said switching means for controlling the voltage of said dynamo-electric machine.

5. In a system of distribution, an alternating current circuit, a direct current circuit, a synchronous converter for interconnecting said circuits, a polyphase transformer having a primary winding connected to said alternating current circuit and a secondary winding connected to said synchronous converter, a synchronous dynamo-electric machine connected to rotate in electrical phase synchronism with said synchronous converter, said dynamo-electric machine having an armature winding arranged to be connected in series relation with said transformer primary winding to form a star connection therefor and provided with a tap at its electrical mid-point to form the neutral terminal for said star connection, switching means for making connections successively between alternate outside terminals of the winding of said dynamo-electric machine and different transformer taps, means responsive to the voltage of said dynamo-electric machine for controlling said switching means, and means operative in accordance with the sequence of switching and the period in the cycle of switching for controlling the excitation of said dynamo-electric machine.

6. In a system of distribution, an alternating current circuit, a direct current circuit, a synchronous converter for interconnecting said circuits, a polyphase transformer having a primary winding connected to said alternating current circuit and a secondary winding connected to said synchronous converter, a synchronous dynamo-electric machine connected to rotate in electrical phase synchronism with said synchronous converter, said dynamo-electric machine having an armature winding arranged to be connected in series relation with said transformer primary winding to form a star connection therefor and provided with a tap at its electrical mid-point to form the neutral terminal for said star connection, switching means for selectively connecting an outside terminal of said dynamo-electric machine to a predetermined transformer tap, means responsive to the voltage of said direct current circuit for operating said switching means, and means controlled by said direct current responsive means for varying the voltage of said dynamo-electric machine in opposite directions from zero during the connection to a given tap and for equalizing the potential between the outside terminals of the winding of said dynamo-electric machine and the potential between adjacent taps of said transformer during the transition from one transformer tap to another.

In witness whereof, I have hereunto set my hand this 13th day of August, 1928.

THEOPHILUS F. BARTON.